Feb. 20, 1951 W. H. HAUPT 2,542,196
X-RAY APPARATUS
Filed Oct. 24, 1949 4 Sheets-Sheet 3
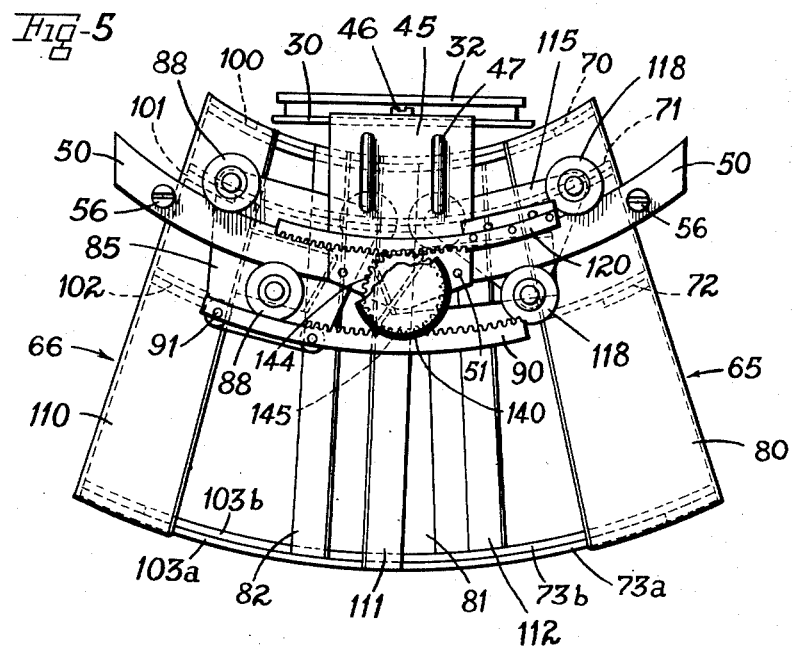
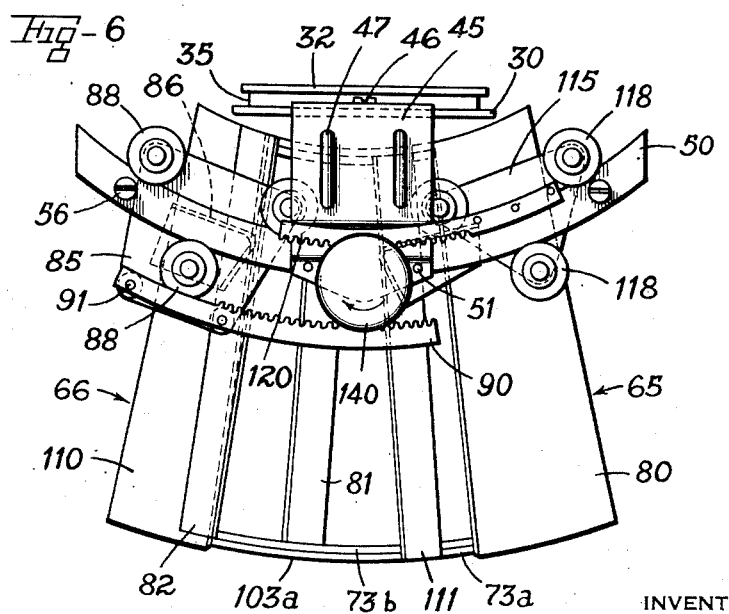
INVENTOR
Walter H. Haupt
BY
Marechal & Biebel
ATTORNEYS

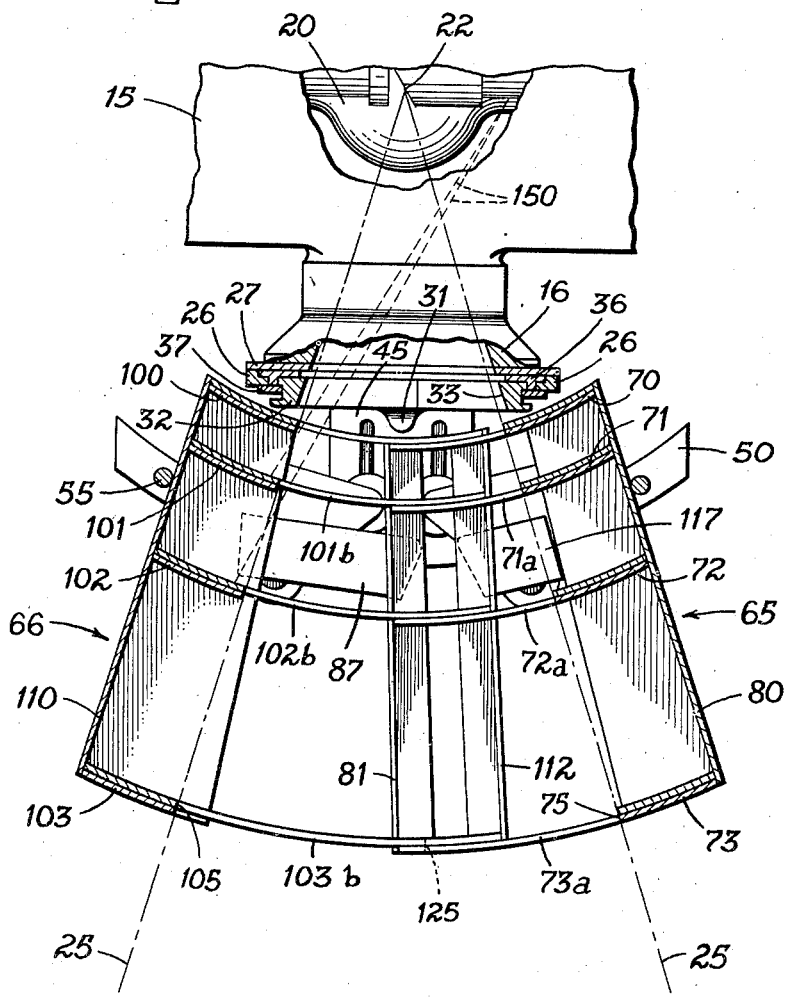
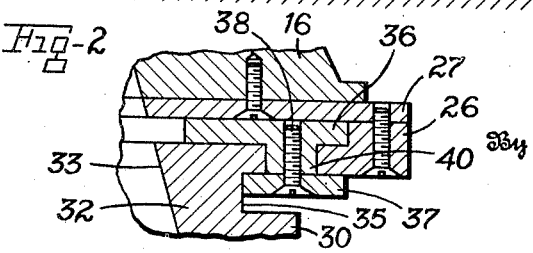

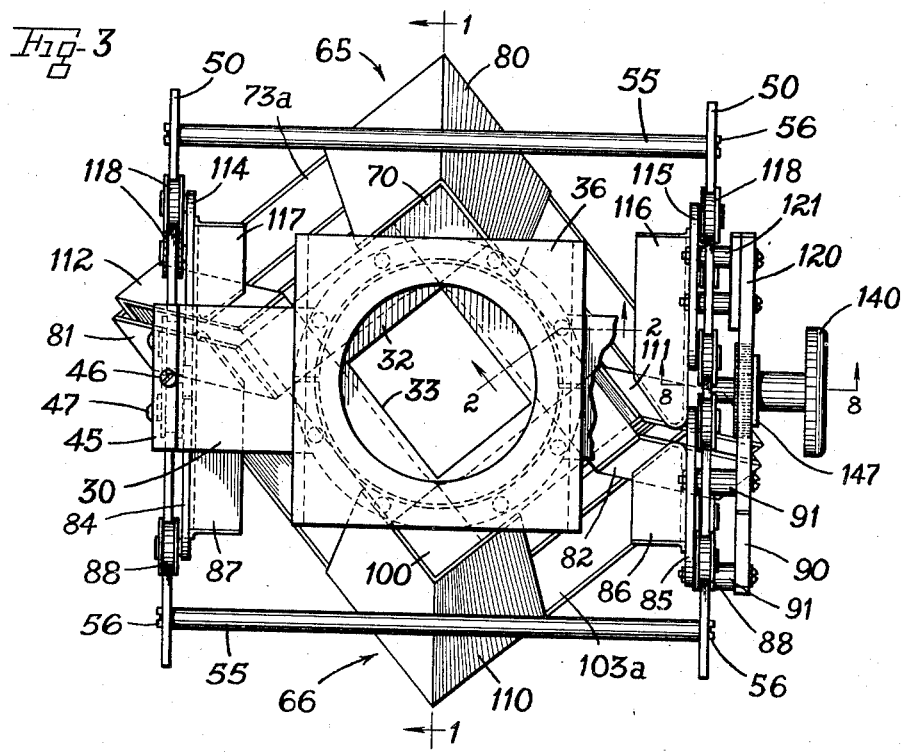

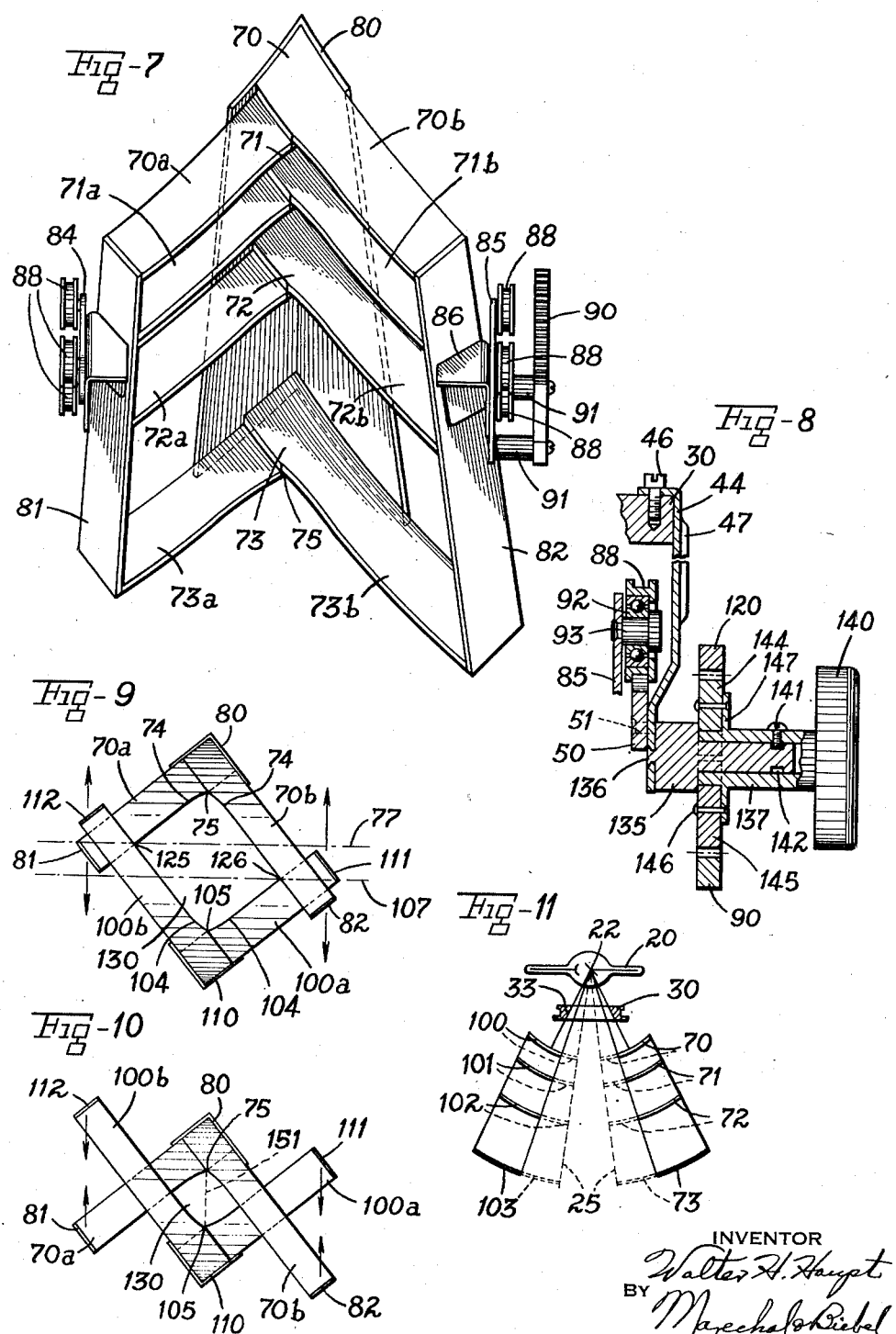

Patented Feb. 20, 1951

2,542,196

UNITED STATES PATENT OFFICE 2,542,196

X-RAY APPARATUS

Walter H. Haupt, Ludlow, Ky., assignor to The Kelley-Koett Manufacturing Company, Covington, Ky., a corporation of Ohio Application October 24, 1949, Serial No. 123,128

17 Claims. (Cl. 250—105)

This invention relates to apparatus for controlling the shape and size of a beam of radiation such as an X-ray beam.

In X-ray work, particularly for purposes of medical treatment or examination, unless the X-ray beam is confined to the desired size and pattern at all times, injury to both the patient and the operator may result. Furthermore, in radiographic and fluoroscopic work, effective shuttering or diaphragming of the beam is especially desirable from the standpoint of clarity of the resulting image. Not only is it necessary to confine the beam in accordance with the area of the screen to be illustrated or of the film to be exposed, but increased clarity is obtained when adequate control is effected of the stem and stray radiation, i. e. radiation from the stem supporting the focal spot of the X-ray tube and other random radiation tending to fog the film unless controlled.

Highly desirable results are obtained from the standpoint of clarity in radiography when the X-ray beam is shuttered or diaphragmed at a plurality of positions spaced from each other in the direction of propagation of the beam, with the apertures through which the beam passes of such dimensions and spacing with relation to each other and to the tube as to be of substantially equal angular dimensions with respect to the focal spot of the tube. Proper restriction of stem and stray radiation is secured when the beam is multiple-diaphragmed in this manner, and radiographic pictures of improved clarity and quality are obtained. For example, satisfactory results have been obtained with the use of a diaphragming cone having two fixed apertures at opposite ends thereof which are lined up along the some limiting surface of the X-ray beam. However, since in such a cone the two apertures are of fixed dimensions, it is necessary to use a cone of a different size or to vary the distance of the tube from the subject in order to change the effective dimensions of the projected beam at the film or screen.

It is accordingly one of the principal objects of the present invention to provide an adjustable shutter or diaphragm device adapted for use with an X-ray tube which includes a plurality of adjustable diaphragming members or shutters arranged to define a plurality of aligned apertures spaced from each other in the direction of travel of the beam therethrough, and which also includes an adjusting mechanism so correlated with the shutters as to establish substantially equal angular dimensions with respect to the focal spot of the tube for all the apertures defined by the shutters in each adjusted position of the device.

Another object is to provide such a control device having a plurality of relatively adjustable diaphragms cooperating to enclose an aperture for the beam and arranged for adjusting movement in an arc or arcs centered with respect to a common reference position to vary the size of the aperture and which is adapted for mounting in such relation with an X-ray tube that the adjusting movements of the diaphragms are in centered relation with the focal spot of the tube.

An additional object is to provide an adjustable shutter mechanism or diaphragming device adapted for use with an X-ray tube having a plurality of shutters or diaphragm members which are mounted for adjusting movement in an arc or arcs centered with respect to the focal spot of the tube and which are curved in substantial conformity with the arc or arcs in which they move to give increased accuracy of control of the size and shape of the beam projected therethrough.

It is also an object of the invention to provide a shuttering device adapted for X-ray work wherein the edges of the diaphragm members which define the aperture for the beam are curved in such relation to the focal spot of the X-ray tube as to form an essentially rectangular pattern when the beam is projected on a flat surface such as a film or fluoroscopic screen.

Other objects and advantages of the invention will be apparent from the following description, the accompanying drawings and the appended claims.

In the drawings—

Fig. 1 is a somewhat diagrammatic view illustrating a multiple-diaphragm device in accordance with the invention mounted in operative relation with an X-ray tube head, the diaphragm device being shown in section substantially on the line 1—1 of Fig. 3;

Fig. 2 is a fragmentary section on the line 2—2 of Fig. 3;

Fig. 3 is an end view of the diaphragm device looking in the direction of travel of the beam, with a portion of the frame being broken away to illustrate details of construction;

Fig. 4 is a side elevation of the device with portions broken away and in section;

Fig. 5 is another side view taken at right angles of Fig. 4 and showing the device adjusted to its widest position corresponding with Fig. 1;

Fig. 6 is a view similar to Fig. 4 showing the device adjusted to its narrowest position;

Fig. 7 is a detailed view in perspective of one of the component diaphragm or shutter units of the device;

Fig. 8 is a fragmentary section on the line 8—8 of Fig. 3 showing the adjusting mechanism of the device;

Figs. 9 and 10 are diagrammatic views illustrating the operation of the device and corresponding respectively to views 5 and 6; and Fig. 11 is a diagrammatic view similar to Fig. 1 further illustrating the operation of the device.

Referring to the drawings, which illustrate a preferred embodiment of the invention, Fig. 1 shows a fragment 15 of an X-ray tube head provided with an annular boss or extension 16 through which the X-ray beam is projected from the tube 20, the focal spot of the tube being indicated at 22 and the beam being represented by the ray lines 25. At the lower end of the tube head is a pair of cone slides 26, shown as bolted to the tube mounting plate 27 which is in turn bolted to the boss 16.

The diaphragming device of the invention is mounted on the tube head 15 and includes a plurality of sets of complementary shutter members which cooperate to define a similar plurality of enclosed and aligned apertures spaced along the direction of travel of the beam 25. These shutter members are mounted for adjusting movement towards and away from each other to vary the sizes of these apertures and thus to vary the angular pattern of the projected beam as desired for radiography or fluoroscopy, and the construction and arrangement of these shutter members is such that the angular dimensions of all the apertures are substantially equal with respect to the focal spot of the tube in each adjusted position of the device.

The supporting frame of the device includes an elongated plate 30 having a reinforcing rib 31 and formed with a circular central portion of increased width which includes an upwardly projecting cylindrical boss 32. A rectangular opening 33 is formed in the boss 32, and the sides of this opening are tapered upwardly as shown in Fig. 1. In order to mount the device on the tube head, the periphery of the boss 32 is grooved at 35 (Fig. 2), and an annular cone slide plate 36 is secured to boss 32 by means of a two-piece ring 37 rotatably received within the groove 35 and screwed at 38 to the downwardly projecting annular portion 40 of plate 36.

The upper portion of plate 36 is square and is of such dimensions as to be slidably received in the cone slides 26, and these parts are all so proportioned with respect to the tube head as to establish a predetermined spaced relationship between the bar and the focal spot 22 of the tube in the operative position of the device for reference purposes in the construction and arrangement of the diaphragm members and associated parts of the device. It has also been found desirable to arrange the opening 33 in such relation to the tube that the projections of its tapered surfaces will intersect at the focal spot of the tube.

At each end of the plate 30 is a downwardly extending bracket or hanger 44, 45 bolted to plate 30 at 46 and shown as formed with a plurality of pressed out stiffening ribs 47. Each of these bracket members carries a track member 50 of flat stock which is riveted to the bracket at 51. These tracks 50 are arcuate in shape, having their upper and lower edges curved about the same center of curvature, and the radii of these edges are shown as centered on a line which passes through the focal spot 22 of the tube transversely of the direction of travel of the beam when the device is mounted in position on the tube head as shown in Fig. 1. A pair of spacer rods 55 extends across the device between the ends of tracks 50, the tracks being secured to the ends of these rods by screws 56.

The tracks 50 support a pair of complementary diaphragm units 65 and 66 which include the sets of cooperating shutters and are mounted for relative adjusting movement along the tracks. The diaphragm unit 65 is shown in detail in Fig. 7, and it includes a plurality of L-shaped diaphragming members or shutters of graduated sizes, four of these shutters being shown and identified as 70, 71, 72 and 73. These shutters are composed of X-ray impervious material, satisfactory results having been obtained utilizing a lamination comprising a layer of lead between two layers of brass, and they may be cut from a single sheet or formed by binding the ends of straight straps 70a and 70b, etc., in overlapping relation as shown.

The inner edges of the two arm portions of each shutter 70—73 are straight over the major portion of their lengths, but these edges are curved towards each other about relatively long radii as indicated at 74 adjacent the point 75 at which they intersect. In addition, each of the shutters 70—73 is curved in such manner that it substantially conforms with a fragment of a cylinder having its axis parallel to the direction indicated by the dotted line 77 in Fig. 9, and thus substantially transverse of the diagonal of the shutter, and the construction of the unit is such that when it is mounted on a tube head as shown in Fig. 1, this axis of curvature of each of the shutters will pass through the focal spot 22 of the tube transversely of the direction of travel of the beam. The shutters are secured in the unit in the spaced and parallel relation by means of an angle-shaped member 80, which receives the apex of each shutter, and a pair of straps or plates 81 and 82 at the outer ends of the shutter arms. The individual shutters 70—73 are secured to these frame members by spot welding or in any other suitable way, and it will also be noted that the relative spacing of adjacent shutters in the unit increases in the direction of travel of the beam through the device as indicated in Fig. 1.

In order to mount this diaphragm unit on the tracks 50, two supporting plates 84 and 85 are secured to the end plates 81 and 82 by means of brackets 86 and 87. Each of these plates 84 and 85 carries three grooved rollers 88 adapted to engage the adjacent track 50, two of these rollers being above the track and the other below the track, and the unit can thus move back and forth along tracks 50 as desired. In addition, the plate 85 carries a curved rack 90 which is secured thereto by means of pins and spacers 91 and extends laterally therefrom, this rack being provided with teeth in the upper edge thereof and being curved about the same center line as tracks 50 and shutters 70—73. It will be noted that plate 85 is generally trapezoidal in outline as contrasted with the generally triangular shape of plate 84 to provide for mounting rack 90 thereon. In order to assure free movement of the diaphragm unit along tracks 50, the rollers 88 may be provided with suitable ball bearings 92 on the studs 93 as indicated in Fig. 8.

The other diaphragm unit 66 is similar in construction to the unit 65 shown in Fig. 7, and it includes an identical plurality of shutters 100, 101, 102 and 103. The arms 100a—100b, etc., of each of these shutters are identical in construction to the corresponding parts of the shutters 70—73, each being curved along the portions 104 adjacent their respective points 105 of intersection, and each of these shutters is similarly curved to substantial conformity with a cylindrical surface having its axis passing through the focal spot 22 of tube 20, as indicated by the directional line 107 in Fig. 9.

The frame members 110, 111 and 112 of diaphragm unit 66 are shown as identical with the parts 80, 81 and 82, respectively, and they are similarly secured to the shutters 100—101 to maintain the latter in the desired spaced and aligned relation. The plates 114 and 115 are shown as identical with the plate 84 of shutter unit 65, and they are secured to the straps 111 and 112 by means of brackets 116 and 117. Each of plates 114 and 115 carries three rollers 118 similar to the rollers 88, and the plate 115 also carries a curved rack 120 which extends above the rack 90 and has teeth along its lower edge, the rack 90 being secured to plate 115 by pins and spacers 121.

The two diaphragm units 65 and 66 are assembled on tracks 50 in such manner that the arm portions of each pair of complementary shutters, for example the shutters 70 and 100, intersect in overlapping relation, the respective points of intersection of the shutter arms 70a and 70b with shutter arms 100a and 100b, as well as the corresponding points for the other pairs of shutter arms, being indicated at 125 and 126. It will thus be seen that the two shutters in each cooperating pair lie at approximately the same distance from the focal spot 22 of the tube and define a totally enclosed aperture 130 of generally rectangular configuration for the X-ray beam to pass through, with these apertures being aligned in the direction of the travel of the beam towards the film or plate on which the X-ray picture is to be formed, which is indicated diagrammatically at 131 in Fig. 1. It will also be apparent that in order to assemble the two units 65 and 66 with the shutters in the desired overlapping relation, the end straps 111 and 112, or the corresponding parts 81 and 82, should not be secured in place until after the shutters have been properly interleaved.

The two diaphragm units are adjustable with respect to each other along the tracks 50 to vary the sizes of the apertures 130, and Fig. 8 shows in detail the adjusting mechanism for effecting this back and forth movement of the units. A stud 135 is peened or otherwise secured at 136 to the lower end of hanger 44, and the forward end of this stud is rotatably received within the hollow shank portion 137 of a control knob 140, the knob and stud being held together by means such as a set screw 141 engaging in a peripheral groove 142 near the outer end of the stud. Two semi-circular gear segments 144 and 145 are secured to the control knob 140, these segments being shown as riveted at 146 to a circumferential flange portion 147 extending radially from the shank 137. The lower gear segment 144 engages the teeth of the rack 90 carried by diaphragm unit 65, and the other segment 145 engages the teeth of rack 120. Since the two racks are curved about radii of different lengths, their respective teeth are of different pitch diameters, and in order to assure the same angular movement for both diaphragm units, the teeth of the gear segments are similarly of the proper different pitch diameters and spacing, the arrangement being such that the full adjusting movements of the two diaphragm units require slightly less than 180° rotation of knob 140.

Figs. 1 and 5 show the device with the diaphragm units 65 and 66 adjusted to their maximum distance apart to give maximum dimensions for each of the apertures 130. It will be noted in Fig. 1 that in this setting of the device, the corners 75 of all of these apertures line up along the same ray 25, and the same is true for the corners 105. The same is also true of the other corners 125 and 126 of the apertures, as well as all other similarly corresponding points along the shutters of each unit, and it will thus been seen that all four apertures 130 are of substantially identical angular dimensions with respect to the focal spot 22. As a result, each of the three lower pairs of shutters will transmit the full beam from the focal spot 22 which is transmitted by the upper pair of shutters 70—100, and at the same time, stem and stray radiation propagated in such directions as to pass through the aperture defined by shutters 70—100 will be intercepted by one of the lower pairs of shutters and will thus be prevented from reaching the film, such stem and stray radiation being represented in Fig. 1 by the broken lines 150.

When the diaphragm units 65 and 66 are adjusted along tracks 50, the individual shutters of each pair move towards or away from each other along the diagonal 151 connecting the corners 75 and 105 of each aperture 130, and the dimensions of each aperture will thus vary as illustrated by Figs. 9 to 11. However, since the individual shutters in each unit are in fixed relative alignment, and since the adjusting movement of the units is about an axis passing through the focal spot 22, it will be seen that all of the shutters are maintained in alignment with the focal spot. As a result, in each adjusted position of the device the angular dimensions of all of the apertures 130 with respect to focal spot 22 will be substantially equal, and the proportions of each aperture will remain substantially constant.

This is illustrated by the diagrammatic showing in Fig. 11, in which the full line showing represents the shutters in the widest setting of the device corresponding to Figs. 1, 5 and 9, and in which the dotted line showing represents the setting of the device giving the smallest effective aperture for the beam and corresponds to Figs. 6 and 10. It will be apparent from Fig. 11 that since the adjusting movement of the diaphragm units is along the arcuate tracks 50 which are curved about an axis passing through the focal spot 22, the shutters move about their own centers of curvature along arcs substantially concentric with these tracks, and in each intermediate setting of the device, the pairs of complementary shutters will define apertures 130 of substantially equal angular dimensions with respect to the focal spot 22 and will thus maintain a sharply defined pattern for the beam free from stem and stray radiation.

The curved configuration of the individual shutters indicated at 74 and 104 is provided to compensate for the fact that the linear distance from each shutter to the film or plate 131 varies in the direction of the diagonal 151 (Fig. 10) connecting the opposite corners 75 and 105 of each aperture 130. If the edges of the individual shutters were straight so as to give a truly rectangular shape to each aperture 130, the projected pattern on the flat surface 131 would be more or less diamond-shaped, with the corners 75 and 105 being more or less elongated and with the adjacent edge portions of the pattern being slightly concave. This effect is reduced by the curved configuration of the shutter edges at 74 and 104, and the result of this arrangement is to impart a substantially rectangular configuration to the projected pattern. This correction or compensation is not necessary for the other pair of opposite corners 125 and 126 of the apertures 130, since these points move in and out transversely of the direction of the travel of the beam as the shutter units are adjusted, and their linear spacing from the film is substantially the same in all adjusted positions of the device for a given setting of the tube head. This will be apparent by reference to Fig. 1, from which it will be seen that the point 125 moves substantially normally to the plane of the sheet as the shutter units approach each other along the curved tracks 50 and does not vary in its spacing from film or plate 131.

The shapes of the individual shutters may be readily modified as desired to give a particular pattern to the beam, but the L-shaped form shown is simple and easy to construct and operate as well as particularly useful for radiographic work with X-ray film of the present standard dimensions. Thus with these individual shutters formed with their two arms in relative proportions of approximately four to five and with the units mounted and arranged as shown, the device may be adjusted as described to define apertures 130 corresponding in proportion for practical purposes to the standard sizes of X-ray film such as 4 x 5, 6 x 8, 8 x 10, etc. It will also be noted that with the device mounted on the tube head by means of a rotatable connection to the slide plate 36, the device may be readily rotated about the direction of travel of the beam to give a desired relation between the projected pattern of the beam and the area of film to be exposed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An adjustable shutter device of the character described adapted for use in conjunction with an X-ray tube to regulate the shape and size of the effective X-ray beam and to restrict objectionable stem and stray radiation, comprising a plurality of sets of relatively adjustable shutters of X-ray impervious material, the shutters of each said set being arranged in cooperative relation to define an enclosed aperture for the beam, means for supporting said sets of shutters in spaced relation with the apertures defined thereby aligned for transmission of the beam therethrough and with said apertures of progressively greater effective area in the direction of travel of said beam therethrough, means for effecting relative adjustment of the shutters of each said set to vary the dimensions of the aperture defined thereby, and means for correlating the adjusting movements of all of said shutters with relation to a predetermined reference point to establish substantially equal angular dimensions for all of said apertures with respect to said reference point in each adjusted position of said device while maintaining said apertures in said progressively greater relation.

2. An adjustable shutter device adapted for use with an X-ray tube to regulate the size and shape of the effective X-ray beam and to restrict objectionable stem and stray radiation, comprising a plurality of shutter means, means for mounting said shutter means at different distances from the focal spot of the X-ray tube, each said shutter means being substantially impervious to X-rays and defining an enclosed aperture through which the X-ray beam is allowed to pass, said apertures being of progressively greater effective area in the direction of travel of said beam therethrough, means for simultaneously adjusting said plurality of shutter means to selectively enlarge or reduce the respective apertures therethrough, and means actuated by said adjusting means for producing adjustments of the apertures through said plurality of shutter means varying in size in direct relation to the spacing of said shutter means from said focal spot while maintaining said apertures in said progressively greater relation.

3. An adjustable shutter device adapted for use with an X-ray tube to regulate the size and shape of the effective X-ray beam and to restrict objectionable stem and stray radiation, comprising a plurality of shutter means, means for mounting said shutter means at different distances from the focal spot of the X-ray tube, each said shutter means being substantially impervious to X-rays and defining an enclosed aperture through which the X-ray beam is allowed to pass, said apertures being of progressively greater effective area in the direction of travel of said beam therethrough, means for simultaneously adjusting said plurality of shutter means to selectively enlarge or reduce the respective apertures therethrough, and means actuated by said adjusting means for producing adjustments in the size of the aperture defined by each of said plurality of shutter means while maintaining all said shutter means in substantially direct alignment with said focal spot throughout the range of adjustment thereof and while maintaining said apertures in said progressively greater relation.

4. An adjustable shutter device of the character described adapted for use in conjunction with an X-ray tube to regulate the shape and size of the effective X-ray beam and to restrict objectionable stem and stray radiation, comprising a plurality of sets of complementary shutters of X-ray impervious material, means for supporting each of said sets of shutters in cooperating relationship defining an enclosed aperture for the beam, means for mounting said sets of shutters in spaced relation with respect to each other and to a predetermined reference point with said apertures aligned for transmission therethrough of a beam emanating from said reference point, and with said apertures of progressively greater effective area in the direction of travel of said beam therethrough, means for simultaneously adjusting all of said shutters to vary the sizes of said apertures, and means establishing a centered relationship between said adjusting means and said reference point to maintain the angular movement of the corresponding shutters in each said set substantially equal with respect to said reference point and thereby to establish substantially equal angular dimensions for all of said apertures with respect to said reference point in each adjusted position of said device while maintaining said apertures in said progressively greater relation.

5. An adjustable shutter device of the character described adapted for use in conjunction with an X-ray tube to regulate the shape and size of the effective X-ray beam and to restrict objectionable stem and stray radiation, comprising a plurality of sets of relatively adjustable shutters of X-ray impervious material, the shutters of each said set being arranged in cooperative relation to define an enclosed aperture for the beam, means for supporting said sets of shutters in spaced relation with the apertures defined thereby aligned for transmission of the beam therethrough and with said apertures of progressively greater effective area in the direction of travel of said beam therethrough, means for mounting said device in predetermined relation with the focal spot of said tube, and means for effecting simultaneous adjustment of all of said shutters along substantially arcuate paths substantially concentric with each other and in centered relation with said focal spot to establish substantially equal angular dimensions for all of said apertures with respect to said focal spot in each adjusted position of said device throughout the range of adjusted positions thereof while maintaining said apertures in said progressively greater relation.

6. An adjustable shutter device of the character described adapted for use in conjunction with an X-ray tube to regulate the shape and size of the effective X-ray beam and to restrict stem and stray radiation, comprising a plurality of shutters, means for supporting said shutters in spaced relation, a second plurality of shutters, means for supporting said second plurality of shutters in similarly spaced relation, a frame forming a mounting for said supporting means with said shutters of each said plurality in cooperating relationship defining a plurality of enclosed and aligned apertures for transmission of said beam therethrough, means for causing simultaneous adjusting movement of each said plurality of shutters towards and away from the other said plurality to vary the dimensions of said apertures, and means for guiding said adjusting means along a substantially arcuate path in substantially centered relation with an axis passing through a predetermined reference point substantially transversely of the direction of alignment of said apertures to establish substantially equal angular dimensions for all of said apertures with respect to said reference point in each adjusted position of said device.

7. An adjustable shutter device of the character described adapted for use in conjunction with an X-ray tube to regulate the shape and size of the effective X-ray beam and to restrict stem and stray radiation, comprising a plurality of shutters, means for supporting said shutters in spaced relation, a second plurality of shutters, means for supporting said second plurality of shutters in similarly spaced relation, a frame forming a mounting for said supporting means with the shutters of each said plurality in cooperating relationship and with the adjacent edges of said cooperating shutters defining a plurality of enclosed apertures aligned with a predetermined reference point and of progressively greater effective area in the direction of travel of said beam therethrough, said shutters in each said plurality being supported by said supporting means with the corresponding said edges thereof aligned with said reference point, means for mounting said frame with said reference point substantially coincident with the focal spot of said X-ray tube, and means for causing adjusting movement of said supporting means towards and away from each other along a substantially arcuate path in substantially centered relation with an axis passing through said focal spot substantially transversely of the direction of travel of the beam therefrom through said apertures to vary the dimensions of said apertures while establishing substantially equal angular dimensions for all of said apertures with respect to said focal spot in each adjusted position of said device and while maintaining said apertures in said progressively greater relation.

8. An adjustable shutter device of the character described adapted for use in conjunction with an X-ray tube to regulate the shape and size of the effective X-ray beam and to restrict stem and stray radiation, comprising a plurality of shutters, means for supporting said shutters in spaced relation, a second plurality of shutters, means for supporting said second plurality of shutters in similarly spaced relation, means for mounting said frame in predetermined relationship with the focal spot of said X-ray tube and with said shutters defining a plurality of apertures aligned for transmission of the beam therethrough and of progressively greater effective area in the direction of travel of said beam therethrough, and means for effecting adjusting movement of said supporting means along a substantially arcuate path in centered relation with said focal spot to vary the dimensions of the apertures defined by said shutters while establishing substantially equal angular dimensions for all of said apertures with respect to said focal spot in each adjusted position on said device and while maintaining said apertures in said progressively greater relation, each of said shutters being curved in substantial conformity with a cylindrical surface concentric with said arc to maintain the borders of each of said apertures at substantially constant distances from said focal spot.

9. An adjustable shutter device of the character described adapted for use in conjunction with an X-ray tube to regulate the shape and size of the effective X-ray beam and to restrict stem and stray radiation, comprising a plurality of shutters of X-ray impervious material, means for supporting said shutters in adjustable cooperative relation to define an enclosed aperture for the beam, means for mounting said shutters in predetermined spaced relation with the focal spot of said tube, and means for effecting adjusting movement of said shutters along a substantially arcuate path substantially centered with respect to said focal spot.

10. An adjustable shutter device of the character described adapted for use in conjunction with an X-ray tube to regulate the shape and size of the effective X-ray beam and to restrict stem and stray radiation, comprising a plurality of shutters of X-ray impervious material, means for supporting said shutters in adjustable cooperative relation to define an enclosed aperture for the beam, means for mounting said shutters in predetermined spaced relation with the focal spot of said tube, and means for effecting adjusting movement of said shutters along a substantially arcuate path substantially centered with respect to said focal spot, said shutters being curved in substantial concentricity with said path to maintain substantially constant the effective distances therefrom to said focal spot in all adjusted positions of said device.

11. An adjustable shutter device of the character described adapted for use in conjunction with an X-ray tube to control the shape and size of the effective X-ray beam and to restrict stem and stray radiation, comprising a pair of L-shaped shutters of X-ray impervious material, each of said shutters being curved in substantial conformity with a cylindrical surface having its axis substantially transverse of the diagonal of said shutter, means for supporting said shutters in adjustable cooperative relation to define a substantially rectangular aperture for the beam, means for mounting said shutters in the path of the beam from said tube and with each said shutter spaced from the focal spot of said tube by a distance substantially equal to the radius of curvature of said shutter, and means for adjusting said shutters towards and away from each other while maintaining said shutters in the same spaced relation with said tube to vary the size of said aperture.

12. An adjustable shutter device of the character described adapted for use in conjunction with an X-ray tube to regulate the shape and size of the effective X-ray beam and to restrict stem and stray radiation, comprising a pair of L-shaped shutters of X-ray impervious material each defining an angle, means for supporting said shutters in adjustable cooperative relation to define a substantially rectangular aperture for transmission of said beam therethrough and with said angles forming opposite corners of said aperture, each of said shutters being curved in substantial conformity with a cylindrical surface having its axis substantially transverse of the diagonal of said aperture connecting said corners, means for mounting said shutters in the path of the beam from said tube with each said shutter spaced from the focal spot of said tube by a distance substantially equal to the radius of curvature thereof, and means for adjusting said shutters towards and away from each other approximately along said diagonal of said aperture while maintaining said shutters at substantially constant distances from said focal spot to vary the size of said aperture while maintaining the proportions of said aperture substantially constant.

13. An adjustable shutter device of the character described adapted for use in conjunction with an X-ray tube to regulate the shape and size of the effective X-ray beam projected upon a flat surface while restricting stem and stray radiation, comprising a pair of L-shaped shutters each including a pair of angularly arranged arms, means for supporting said shutters in adjustable cooperative relation to define a substantially rectangular aperture for transmission of said beam therethrough and with said arms of each said shutter forming opposite corners of said aperture, each of said shutters being curved in substantial conformity with a cylindrical surface having its axis substantially transverse of the diagonal of said aperture connecting said corners, and means for adjusting said shutters towards and away from each other about said axis to vary the size of said aperture while maintaining said shutters at substantially constant distances from said focal spot, the intersecting edges of said arms of each said shutter being curved towards each other adjacent the point of intersection thereof to correct for distortion of the pattern of said aperture as projected upon said flat surface.

14. An adjustable shutter device of the character described adapted for use in conjunction with an X-ray tube to regulate the shape and size of the X-ray beam and to restrict objectionable stem and stray radiation, comprising a plurality of sets of shutters of X-ray impervious material having substantially straight edge portions, means for supporting each of said sets of shutters in cooperating relationship defining an enclosed aperture of generally rectangular configuration for the beam, means for mounting said sets of shutters in spaced relation with respect to each other and to the focal spot of said tube with said apertures aligned for transmission of the beam therethrough and with said apertures of progressively greater effective area in the direction of travel of said beam therethrough, means for adjusting the shutters of each said set with respect to each other approximately along a diagonal of the aperture defined thereby to vary the size of said aperture, and means operatively connecting all of said shutters with each other in predetermined centered relationship with said focal spot to maintain the angular movement of the corresponding shutters in each said set substantially equal with respect to said focal spot and thereby to establish substantially equal angular dimensions for all of said apertures with respect to said focal spot in each adjusted position of said device while maintaining said apertures in said progressively greater relation.

15. An adjustable shutter device of the character described adapted for use in conjunction with an X-ray tube to regulate the shape and size of the X-ray beam and to restrict objectionable stem and stray radiation, comprising a plurality of sets of shutters of X-ray impervious material having substantially straight edge portions, means for supporting each of said sets of shutters in cooperating relationship defining an enclosed aperture of generally rectangular configuration for the beam, means for mounting said sets of shutters in spaced relation with respect to each other and to a predetermined reference point with said apertures aligned for transmission therethrough of a beam emanating from said reference point and with said apertures of progressively greater effective area in the direction of travel of said beam therethrough, means for simultaneously adjusting all of said shutters to vary the size of said apertures, means establishing a centered relationship between said adjusting means and said reference point to maintain the angular movements of all of said shutters substantially equal with respect to said reference point and thereby to establish substantially equal angular dimensions for all of said apertures with respect to said reference point in each adjusted position of said device while maintaining said apertures in said progressively greater relation, means for mounting said device in operative relation with said tube and with the focal spot of said tube substantially coinciding with said reference point, and means for rotating said device with respect to said mounting means about an axis passing through said focal spot in the direction of propagation of the beam therefrom.

16. An adjustable shutter device of the character described adapted for use in conjunction with an X-ray tube to regulate the shape and size of the X-ray beam and to restrict objectionable stem and stray radiation, comprising a plurality of sets of complementary shutters of X-ray impervious material, means for supporting each of said sets of shutters in cooperating relationship defining an enclosed aperture for the beam, means for mounting said sets of shutters with said apertures aligned for transmission therethrough of a beam emanating from a predetermined reference point and of progressively greater effective area in the direction of travel of said beam therethrough, and with said sets of shutters in progressively increased spaced relation in the direction of travel of said beam through said apertures, means for simultaneously adjusting all of said shutters to vary the sizes of said apertures, and means establishing a centered relationship between said adjusting means and said reference point to maintain the angular movement of the corresponding shutters in each said set substantially equal with respect to said reference point and thereby to establish substantially equal angular dimensions for all of said apertures with respect to said reference point in each adjusted position of said device while maintaining said apertures in said progressively greater relation.

17. An adjustable shutter device of the character described adapted for use in conjunction with an X-ray tube to regulate the shape and size of the X-ray beam and to restrict objectionable stem and stray radiation, comprising a frame adapted to be mounted in operative relation with said tube in predetermined spaced relation with the focal spot of said tube, a track carried by said frame and curved about a radius centered on an axis passing through said focal spot substantially transversely of the direction of travel of said beam, a pair of shutter units each including a plurality of shutters of X-ray impervious material arranged in spaced relation, means supporting said units on said track with the corresponding shutters therein in cooperative relation defining a plurality of spaced apertures aligned with said beam and of progressively greater effective area in the direction of travel of said beam therethrough, and means for adjusting said units along said track to effect simultaneous adjustment of the sizes of all of said apertures while maintaining the angular movements of all of said shutters substantially equal with respect to said focal spot and while maintaining said apertures in said progressively greater relation.

WALTER H. HAUPT.

REFERENCES CITED

The following references are of record in the file of this patent:

UNITED STATES PATENTS

| Number | Name | Date |
|---|---|---|
| 1,250,730 | Waite | Dec. 18, 1917 |
| 1,909,118 | Raab | May 16, 1933 |
| 2,331,586 | Waisco | Oct. 12, 1943 |

Certificate of Correction

Patent No. 2,542,196                                        February 20, 1951

WALTER H. HAUPT

It is hereby certified that error appears in the printed specification of the above numbered patent requiring correction as follows:

Column 1, line 38, for the word "some" read *same*; column 10, line 33, for "on" read *of*; line 70, for "distances" read *distance*;

and that the said Letters Patent should be read as corrected above, so that the same may conform to the record of the case in the Patent Office.

Signed and sealed this 8th day of May, A. D. 1951.

[SEAL]

THOMAS F. MURPHY,
                                                         *Assistant Commissioner of Patents.*